Oct. 9, 1951     A. E. ZECH     2,570,999

TRAP HOOK

Filed March 16, 1949

Inventor:
August E. Zech,
by *[signature]*
His Attorneys

Patented Oct. 9, 1951

2,570,999

UNITED STATES PATENT OFFICE 2,570,999

TRAP HOOK

August E. Zech, Albany, N. Y.

Application March 16, 1949, Serial No. 81,805

4 Claims. (Cl. 43—37)

My invention relates to the art of fishing and particularly to improvements in trap hooks which are arranged to grab opposite sides of the head of a fish when the line to which the device is connected is jerked.

The principal object of my invention is to provide a trap hook of comparatively simple construction, which can be cheaply fabricated or assembled, and which will be positive in its action. A further object is to provide a trap hook of such design that it can be made or assembled from three hooks.

I accomplish these objects by means of the novel combination of elements described below and illustrated in the accompanying drawing in which.

Figure 1:
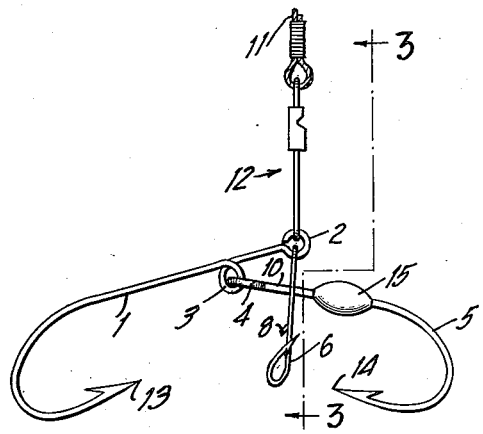
Fig. 1 is an elevation view of my device with the hooks in trap-set position.

Referring to the drawing, my device comprises a hook 1 having a comparatively long shank provided with an eye 2 at one end thereof and a second eye 3 adjacent the eye 2. The eye 3 may be formed by simply bending the shank of hook 1 through an angle of 360°. Pivotally secured in the eye 3, by means of an eye 4 on the end of the shank thereof, is a second hook 5 which is similar in size and shape to the hook 1 except that the shank thereof is substantially equal in length only to that portion of the shank of the hook 1 which is included between the eye 3 and the bight of the hook.

Figure 3:
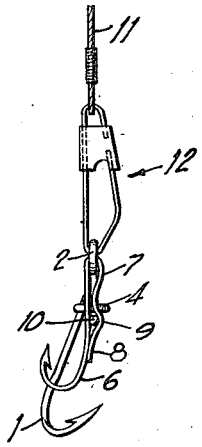
Fig. 3 is a section of Fig. 1 in a plane 3—3.

Depending from the end eye 2 in hook 1 is a third, smaller hook 6, the shape of which is best shown in Fig. 3. Instead of having an eye, the hook 6 has a continuation 7 of the shank thereof bent back upon itself and the axis of which lies in the same plane as the axis of the other portion of the shank except adjacent the extreme lower end 8 (see Fig. 1) where it projects slightly to one side. The bent-down continuation 7 of the shank of hook 6 has a bent-out portion 9 therein forming with the straight, other portion of said shank a yielding, resilient latch adapted to receive and releasably hold the shank 10 of the hook 5 in the position shown in Fig. 1. The line may be attached directly to the eye 2 of the hook 1 or by any other attaching means such as that shown at 12 in the drawing.

In order that the assembly, when suspended from the line, as shown in Fig. 1, will be so balanced as naturally to assume a position in which the points 13 and 14 of the hooks 1 and 5 respectively will lie substantially in a horizontal line or plane, a balancing weight 15 is attached to the shank of the hook 5.

Figure 2:
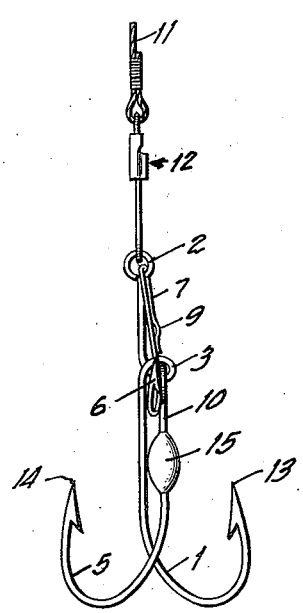
Fig. 2 is a view similar to Fig. 1 with the trap hooks in released position.

In operation, the bait is usually secured to the hook 6, but any or all of the hooks may be baited with a worm or worms, for example, if desired. The device is set by simply pushing the shank of the hook 5 upwardly between the two portions of the shank of hook 6 until it is engaged in the bent-out portion 9 of hook 6; this setting being facilitated by the laterally-extending portion 8 of hook 6. When a fish takes the bait, a jerk on the line 11 will release the hook 5 from its engagement with the latch hook 6 and the hooks 1 and 5 will collapse into the position shown in Fig. 2 so that, if the head of the fish is between the hooks 5 and 1, it will be engaged or grabbed thereby.

While I have described my invention in its preferred embodiment, it is to be understood that the words which I have used are words of description rather than of limitation, and that changes within the purview of the appended claims may be made without departing from the true scope and spirit of my invention in its broader aspects.

What I claim is:

1. In a trap hook of the character described, the combination with a first, jaw-forming hook having an eye at one end adapting it to be connected to a line; of a second jaw-forming hook having an eye at one end; means pivotally connecting the eye of said second hook to said first hook in a zone intermediate the ends of said first hook, a third hook connected to said first hook in the eye thereof and provided with means integral therewith adapted releasably to engage said second hook and normally to hold said jaw-forming hooks in jaw-open position but adapted to release said second hook when a line connected to said first hook is jerked.

2. In a trap hook of the character described, the combination with a first, jaw-forming hook having a first eye at one end adapting it to be connected to a line and a second eye intermediate the ends thereof, a second jaw-forming hook having an eye at one end engaged in the second eye of said first hook, and a third hook engaged in the end eye of said first hook and provided with means integral therewith adapted releasably to engage said second hook and normally hold said jaw-forming hooks in jaw-open relation but to release said second hook when a line connected to said first hook is jerked.

3. A trap hook of the character described comprising the combination with a pair of jaw-forming hooks having interengaging eyes adapting said hooks to swing freely between a jaw-closed position and a jaw-open position, and a third hook connected to one of said pair of hooks and provided with a resilient latch member integral therewith adapted releasably to engage the other of said pair of hooks for holding said pair of hooks in jaw-open relation.

4. A trap hook of the character described comprising the combination with a first, comparatively long hook having a first eye at one end and a second eye adjacent said first eye, a second hook having an eye in one end thereof engaged in the second eye of said first hook and of a length approximately equal to the distance between the hooked end of said first hook and the second eye therein, and a third hook depending from the first eye of said first hook and provided with resilient means adapted releasably to engage said second hook in a zone intermediate the ends thereof for normally holding said first and second hooks in spread-apart relation.

AUGUST E. ZECH.

REFERENCES CITED

The following references are of record in the file of this patent:

UNITED STATES PATENTS

| Number | Name | Date |
| --- | --- | --- |
| 1,236,463 | Madderra | Aug. 14, 1917 |
| 1,239,487 | Hill | Sept. 11, 1917 |
| 1,974,358 | Glau | Sept. 18, 1934 |
| 2,149,062 | Maurer | Feb. 28, 1939 |
| 2,350,650 | Titus | June 6, 1944 |